(12) United States Patent
Yamamoto et al.

(10) Patent No.: US 6,280,071 B1
(45) Date of Patent: Aug. 28, 2001

(54) VEHICULAR HEADLAMP WITH INTEGRATED AIMING BRACKET

(75) Inventors: Kaoru Yamamoto; Kihachiro Uchida, both of Shizuoka (JP)

(73) Assignee: Kotto Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/442,239

(22) Filed: Nov. 17, 1999

(30) Foreign Application Priority Data

Nov. 20, 1998 (JP) .................................................. 10-330754

(51) Int. Cl.[7] .................................................... B60Q 1/00
(52) U.S. Cl. ......................... 362/539; 362/512; 362/523; 362/524; 362/538
(58) Field of Search ..................................... 362/460, 465, 362/514, 539, 512, 66, 268, 285, 427, 524, 538, 523

(56) References Cited

U.S. PATENT DOCUMENTS

| | | | |
|---|---|---|---|
| 4,857,794 | * | 8/1989 | Watanabe .............................. 313/113 |
| 5,119,276 | | 6/1992 | Suzuki .................................... 362/61 |
| 5,283,352 | * | 2/1994 | Remus et al. .......................... 362/61 |
| 5,283,719 | * | 2/1994 | Sekiguchi ............................... 362/61 |
| 5,448,454 | * | 9/1995 | Nonaka .................................. 362/61 |
| 5,567,034 | * | 10/1996 | Dietewich et al. .................... 362/66 |
| 5,899,559 | * | 5/1999 | Lachmayer et al. ................. 362/513 |

FOREIGN PATENT DOCUMENTS 2 753 148   12/1998  (FR) ................................ B60Q/1/04

* cited by examiner

*Primary Examiner*—Sandra O'Shea
*Assistant Examiner*—Guiyoung Lee
(74) *Attorney, Agent, or Firm*—Sughrue, Mion, Zinn, Macpeak & Seas, PLLC

(57) ABSTRACT

A vehicular headlamp including a light source bulb, a reflector reflecting light from the light source bulb forward in a convergent manner, a condensing lens provided at such a position that, of the light reflected from the reflector, at least a meridian light flux in a vertical cross-section is incident as divergent light, a shade provided in proximity to a position of convergence of the meridian light flux and which blocks part of the reflected light, and an aiming bracket to which an aiming member for tilting the reflector is attached. The shade is composed of a metal plate member that is formed integrally with the aiming bracket, and is attached to the reflector. With this construction, the total number of parts of the headlamp is reduced and costs can be reduced accordingly.

9 Claims, 6 Drawing Sheets

VEHICULAR HEADLAMP WITH INTEGRATED AIMING BRACKET

FIELD OF THE INVENTION

The present invention relates to a vehicular headlamp and, more particularly, to a PES-type headlamp.

BACKGROUND OF THE INVENTION

A so-called PES-type headlamp is known as one form of a vehicular headlamp.

As shown in FIG. 6, a PES-type headlamp has a reflector 104 which reflects light from a light source bulb 102 forward (toward a larger open end of the reflector) in a convergent manner, a condensing lens 106 positioned such that, of the light reflected from the reflector, at least a meridian light flux (the light flux shown in FIG. 1 in vertical cross-section) is incident as divergent light, and which controls the direction of radiated light, and a shade 108 provided in proximity to a position of convergence of the meridian light flux and blocking the light reflected from a lower reflection area of the reflector so as to reduce the radiated light. In this PES-type headlamp, an aiming bracket 110 is secured to the reflector 104, and an aiming member for tilting the reflector 104 is attached to the aiming bracket 110.

However, the aforementioned conventional PES-type headlamp has a relatively large number of parts. In order to reduce the total cost of the lighting fixture, it is desired to reduce the number of parts of the headlamp.

The present invention has been made in light of such circumstances.

SUMMARY OF THE INVENTION

It is an object of the present invention to provide a vehicular headlamp in which the number of parts of a PES-type headlamp are reduced so that the total cost of the lighting fixture is reduced.

The present invention achieves the above-stated object by forming a shade integrally with an aiming bracket and appropriately selecting the material of the shade.

In accordance with the present invention, there is provided a vehicular headlamp comprising a light source bulb, a reflector reflecting light from the light source bulb forwards in a convergent manner, a condensing lens positioned such that, of the light reflected from the reflector, at least a meridian light flux is incident as divergent light, a shade provided in proximity to the position of convergence of the meridian light flux and blocking part of the reflected light, and an aiming bracket to which an aiming member for tilting the reflector is attached, wherein the shade is composed of a metal plate member formed integrally with the aiming bracket and attached to the reflector.

The specific design, such as the shape, manner of attachment to the reflector and the like, of the aforementioned shade is not specifically limited.

As indicated by the aforementioned construction, a vehicular headlamp according to the present invention has the shade attached to the reflector, and the shade is formed integrally with the aiming bracket. Therefore, the number of parts of the lighting fixture is reduced, and the total cost of the lighting fixture can be correspondingly reduced. Additionally, because the shade is composed of a metal plate member, the cost of the shade itself can also be reduced.

Thus, according to the present invention, it is possible to reduce the number of parts of the PES-type headlamp and reduce the total cost of the lighting fixture.

In the aforementioned construction, a plurality of projecting portions that project forward may be formed in a front end opening of the reflector, and the shade may be attached to the reflector in such a manner that the shade abuts these projecting portions. In this construction, a predetermined gap is formed between the front end opening of the reflector and the shade. Therefore, the heat generated in the internal space of the reflector can be dissipated into the external space through the gap, whereby the risk of heat deformation of the reflector is reduced.

Further in the aforementioned construction, the shade may be designed to be secured to the reflector at at least two of the projecting portions. The respective projecting portions that are to be secured may also be formed radially outward of the condensing lens, thereby making it possible to tighten the screws (or similar fastener) through operation of a driver inserted from a position in front of the lighting fixture. Thus, the operability, for example, in exchanging component parts of the lighting fixture is enhanced.

DESCRIPTION OF THE PREFERRED EMBODIMENTS

A preferred embodiment of the present invention will be described hereinafter with reference to the drawings.

Figure 1:
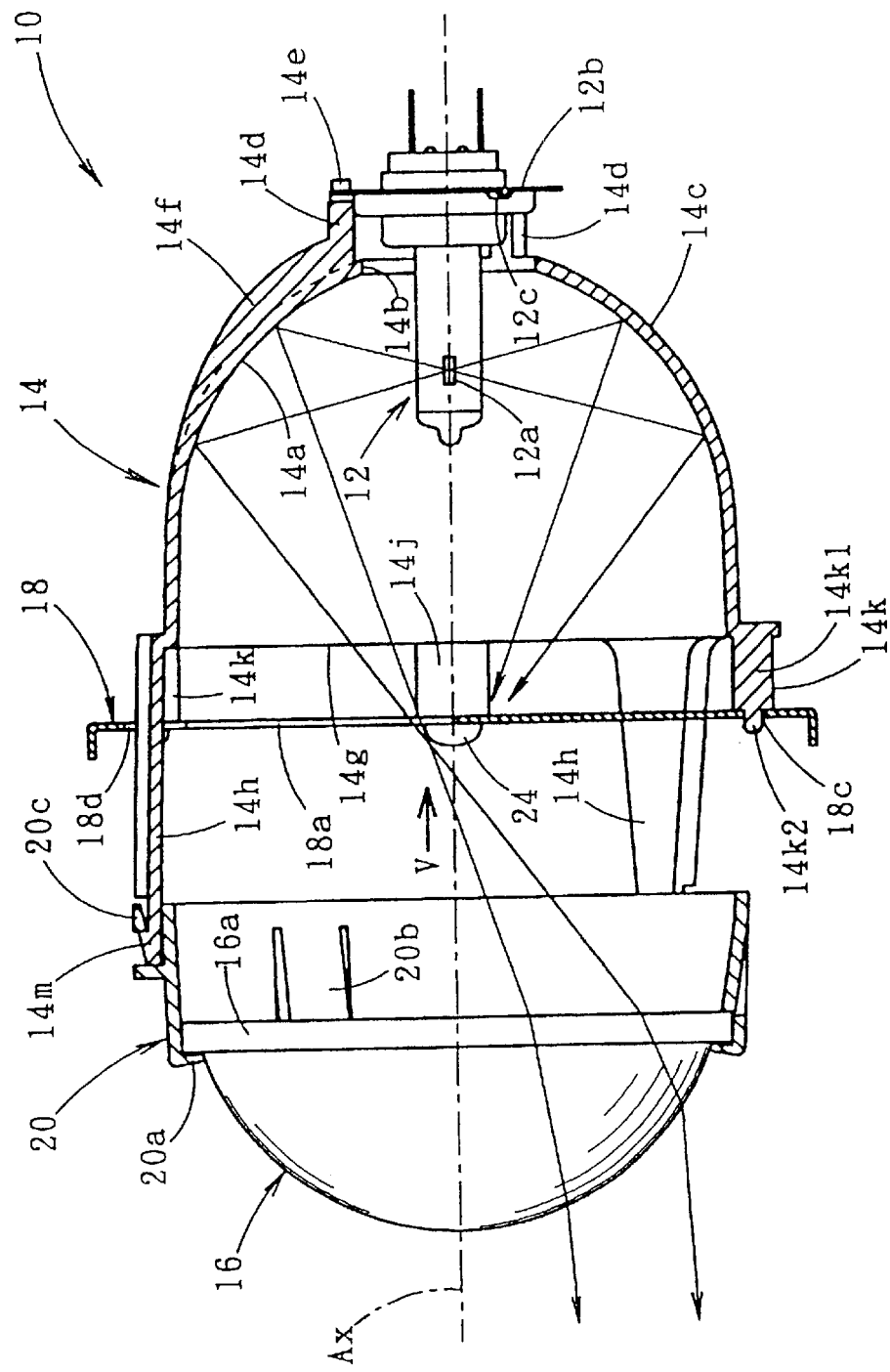
FIG. 1 is a side sectional view of a vehicular headlamp according to one embodiment of the present invention.
Figure 2:
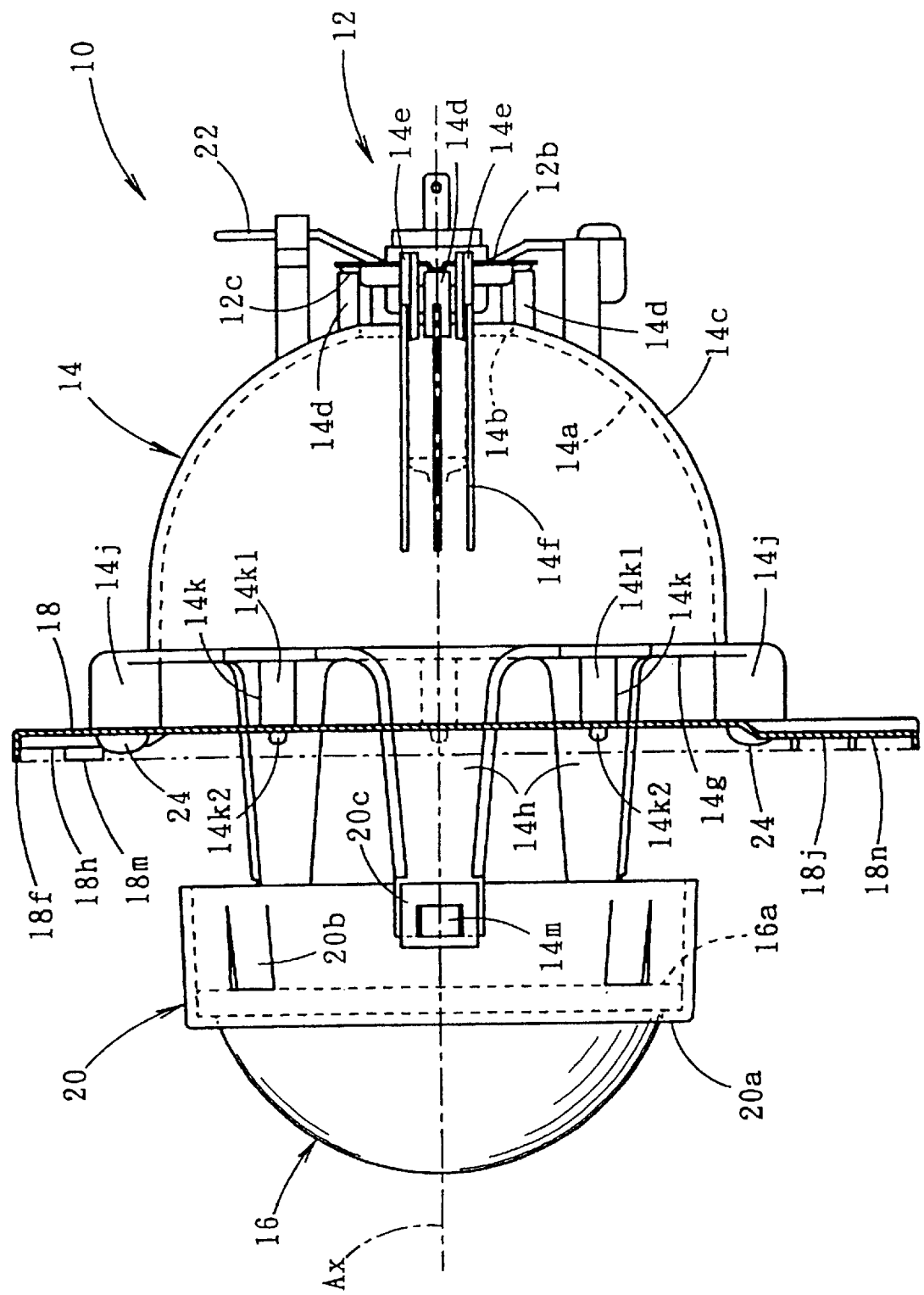
FIG. 2 is a plan view of the vehicular headlamp.
Figure 3:
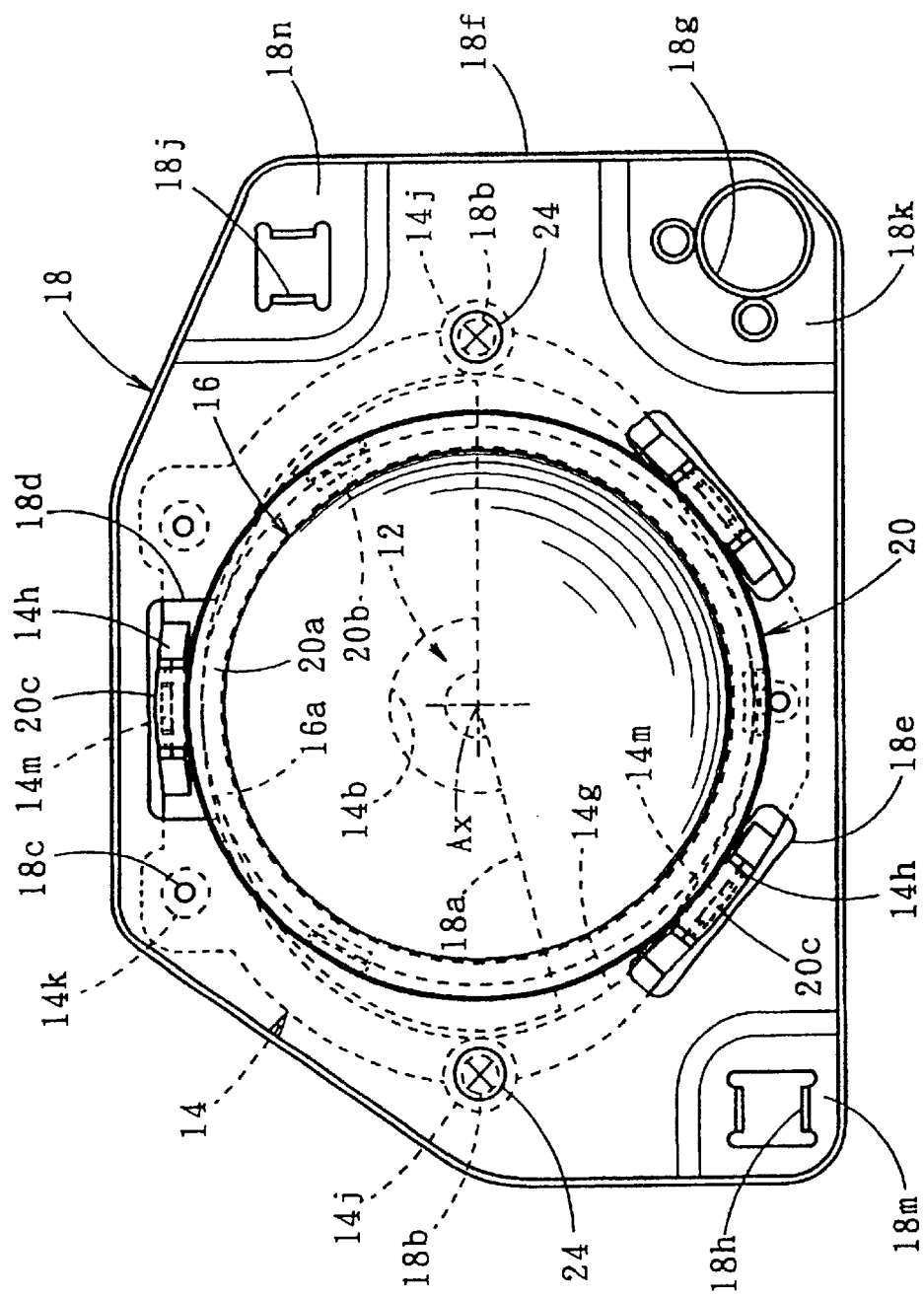
FIG. 3 is a front view of the vehicular headlamp.
Figure 4:
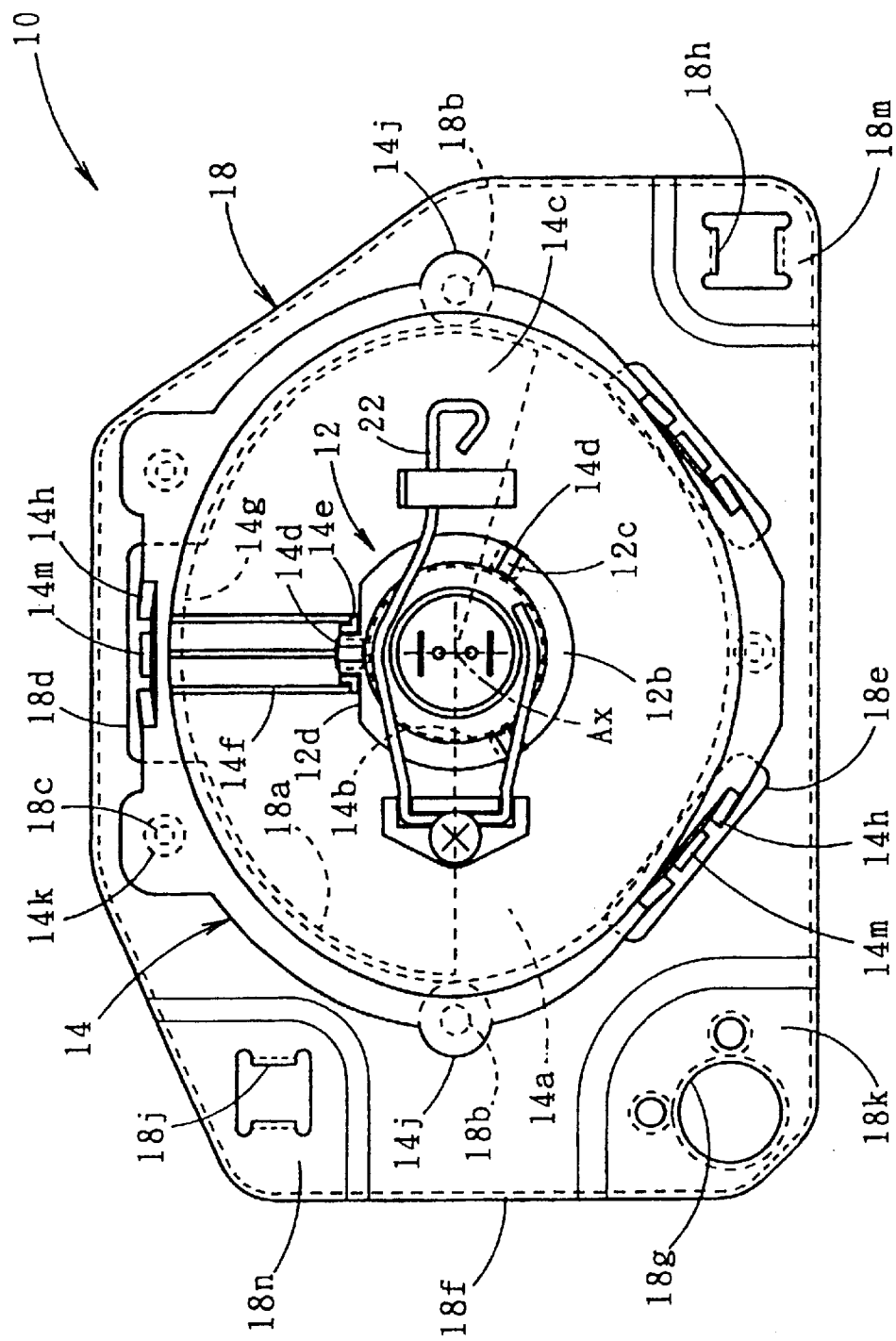
FIG. 4 is a rear view of the vehicular headlamp.
Figure 5:
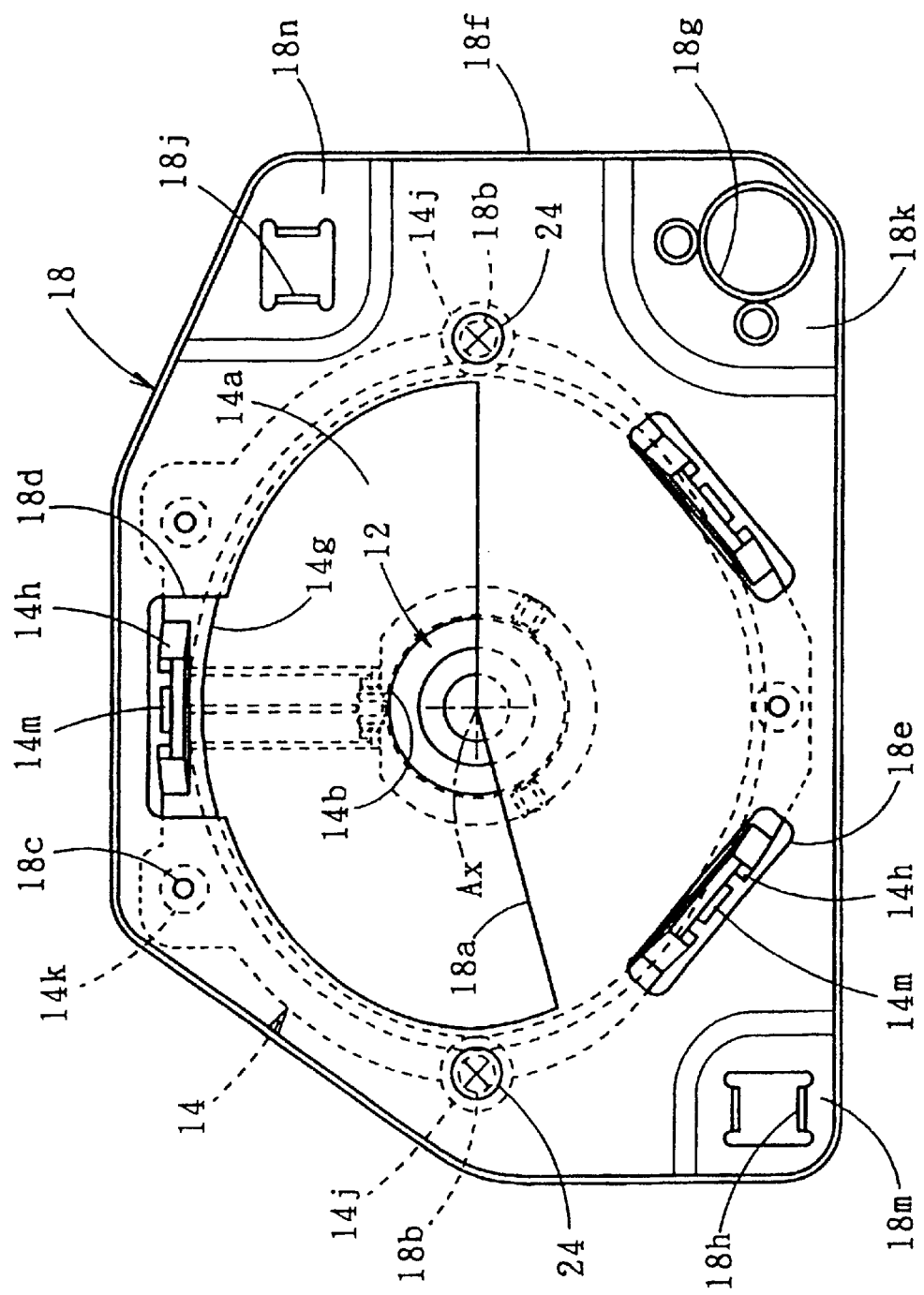
FIG. 5 shows the vehicular headlamp viewed in a direction of an arrow V.
Figure 6:
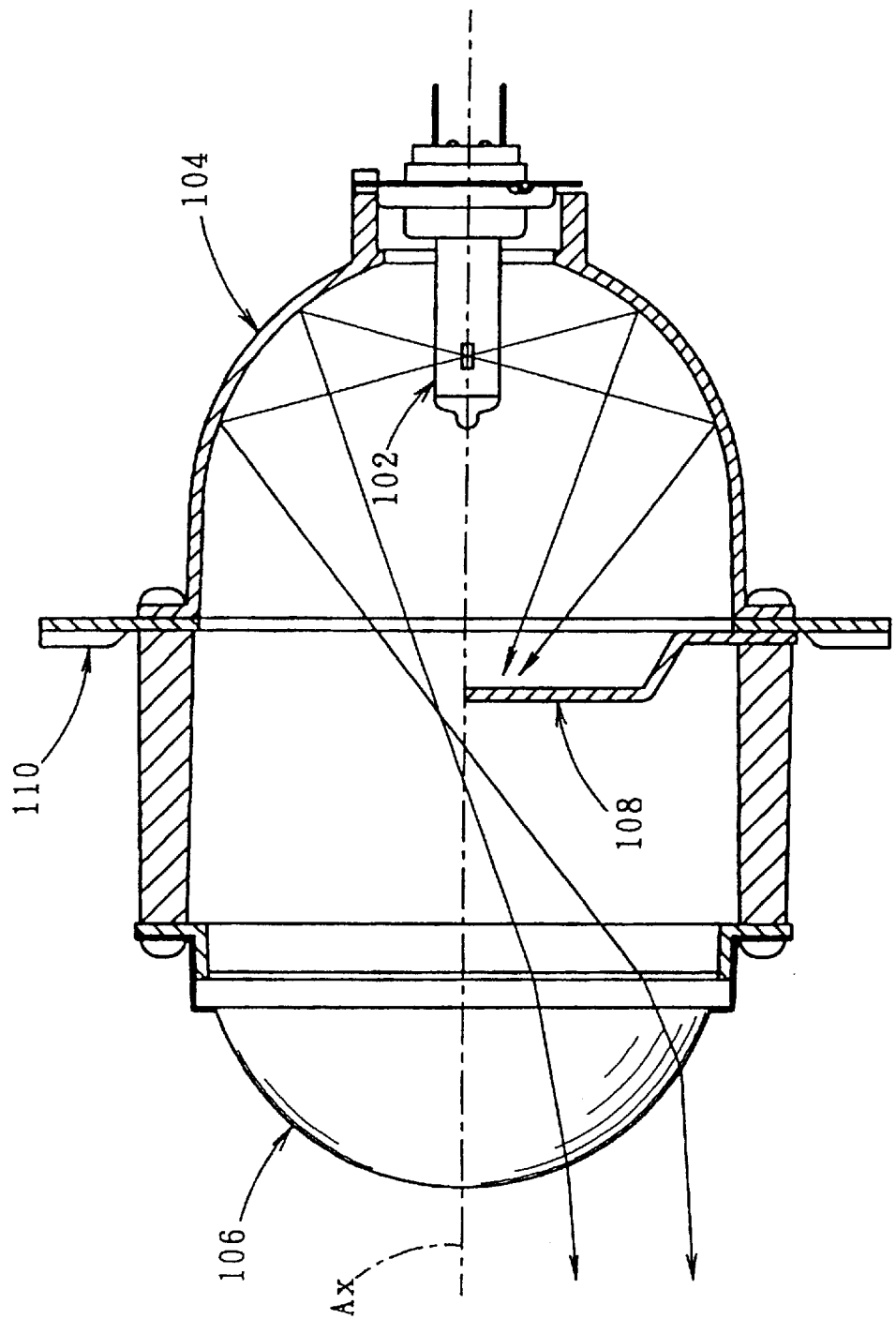
FIG. 6 shows a conventional example and is similar to FIG. 1.

FIG. 1 is a side sectional view of a vehicular headlamp according to a preferred embodiment of the present invention. FIGS. 2, 3 and 4 are, respectively, a plan view, a front view and a rear view of the headlamp. FIG. 5 shows the vehicular headlamp viewed in the direction of an arrow V.

As shown in these drawings, a vehicular headlamp 10 according to this embodiment is a PES-type headlamp equipped with a light source bulb 12, a reflector 14, a condensing lens 16, a shade 18 and a lens holder 20.

The light source bulb 12 is an H7-type halogen bulb having a single filament 12a, and is attached to a rear (opposite the direction of light propagation along an optical axis) peak s portion of the reflector 14 by means of a wire spring 22.

The reflector 14 is a plastic-molded product and has a reflecting surface 14a of such a shape that light from the filament 12a of the light source bulb 12 is reflected forward in a convergent manner. The reflecting surface 14a of the reflector 14 has a substantially elliptic cross-section that includes an optical axis Ax. The eccentricity of the ellipse is greatest in a vertical cross-section and smallest in a horizontal cross-section.

A bulb insertion hole 14b for insertion of the light source bulb 12 is formed in the rear peak portion of the reflector 14. A structure for positioning the light source bulb 12 is provided around the bulb insertion hole 14b.

The three columnar portions 14d are formed around the bulb insertion hole 14b on the external surface 14c of the reflector 14. Three projecting positioning portions 12c, which are formed in a ring portion 12b of the light source bulb 12, abut rear (outermost) end surfaces (substantially perpendicular to the optical axis) of the respective columnar portions 14d. Further, engagement pins 14e are formed on the left and right sides of the columnar portion 14d located at an upper end portion (as mounted in the vehicle) of the bulb insertion hold 14b, extend further rearwards beyond the ring portion 12b of the light source bulb 12, have an L-shaped cross-section and are symmetrical. The engagement pins 14e engage a pair of positioning notch portions 12d formed in the aforementioned ring portion 12b, whereby the light source bulb 12 is held in position rotationally.

A plurality of heat radiation fins 14f are formed on the columnar portion 14d located at the upper end portion of the bulb insertion hole 14b and upper surfaces of the respective engagement pins 14e, and extend onto the external surface 14c of the reflector 14 over a substantial portion thereof.

Three arms 14h for mounting of the lens holder, two bosses 14j for attachment of the shade (projecting portions), and three supporting pins 14k for positioning of the shade (projecting portions) are formed in a front end opening 14g of the reflector 14 in such a manner as to project forward.

While being mounted to the lens holder 20, the condensing lens 16 is positioned such that, of the light reflected from the reflector 14, at least a meridian light flux (the light flux shown in FIG. 1 in vertical cross-section) is incident as divergent light. The lens holder 20, which is a ring-like plastic member having an inner diameter substantially equal to the outer diameter of the condensing lens 16, is securely supported by the reflector 14.

The condensing lens 16 is mounted to the lens holder 20 by the condensing lens 16 to the lens holder 20 from behind. That is, an annular flange 20a that abuts the front face of a peripheral flange 16a of the condensing lens 16 is formed at a front-end inner peripheral portion of the lens holder 20. Engagement strips 20b are formed at three locations along the circumference of the lens holder 20 in such a manner as to project toward the inner periphery by being cut out of the lens holder 20. These engagement strips 20b engage peripheral portions on the back face of the condensing lens 16 fitted to the lens holder 20.

The lens holder 20 is securely supported by the reflector 14 through lance engagement at lance engagement portions 20c formed at three locations on the outer peripheral face of the lens holder 20. Lances 14m are formed at leading end portions of the respective arms 14h for mounting of the lens holder by engagement with the respective lance engagement portions 20c. Flanges for reinforcement are formed at both side portions of each of the arms 14h.

The shade 18 is a press-formed member made of steel plate. The shade 18 is securely supported by the reflector 14 and is located in the vicinity of the position of convergence of the meridian light flux that constitutes part of the light reflected from the reflector 14. A light passage opening 18a is formed in the shade 18 covering a lower area of the front end opening 14g of the reflector 14 creating a shaded sector, blocking light reflected from the lower reflection area of the reflector 14.

The shade 18 is securely supported on the reflector 14 by screws on left and right sides of the front end opening 14g of the reflector 14.

Two bosses 14j for mounting of the shade are formed on left and right sides of the front end opening 14g of the reflector 14 and are located radially outward beyond the condensing lens 16 and the lens holder 20. Screw insertion holes 18b are formed in the shade 18 at locations corresponding to the bosses 14j for attaching the shade. Screws 24 are inserted through the respective insertion holes 18b and secured into the respective bosses 14j to attach and secure the shade.

The supporting pins 14k for positioning the shade are disposed at three locations, two upper edge portions and one lower edge portion, of the front end opening 14g of the reflector 14. Each of the supporting pins 14k is composed of a large-diameter portion 14k1 of the same length as the bosses 14j for attaching the shade, and a small-diameter portion 14k2 projecting from a leading end face of the large-diameter portion 14k1. The small-diameter portion 14k2 is inserted through a positioning hole 18c formed in the shade 18 so that the shade 18 abuts the leading edge face of the large-diameter portion 14k1.

A notch portion 18d is formed by creating an opening in an upper portion of the light passage opening 18a, and a pair of arm insertion holes 18e are formed in the shade 18 to avoid interference with the respective arms 14h for attaching the lens holder of the reflector 14.

In the present embodiment, the shade 18 is also designed to perform the function of an aiming bracket, to which an aiming member (not shown) for tilting the reflector 14 is attached.

The shade 18 is much larger than the front end opening 14g of the reflector 14. A peripheral flange 18f that extends forward is formed along the entire outer periphery of the shade 18, which is thereby imparted a rigidity great enough to be able to function as the aiming bracket. A fulcrum hole 13g is formed in a lower corner portion of the shade 18, and an aiming fulcrum member (not shown) is mounted thereto. A mounting hole 18h is formed in the other lower corner portion of the shade 18, and a nut screwed onto an aiming screw (not shown) for left-and-right tilting movements is mounted thereto. Another mounting hole 18j is formed in an upper corner portion located above the fulcrum hole 18f, and a nut screwed onto an aiming screw (not shown) for up-and-down tilting movements is mounted thereto. Portions of the shade 18 around the fulcrum hole 18g and the mounting holes 18h and 18j are formed as stepped surfaces 18k, 18m and 18n projecting forward of the rest of the shade 18 by a predetermined amount. Thus, the rigidity of the aiming member at the fulcrum hole 18g and the mounting holes 18h, 18j is enhanced.

The vehicular headlamp 10 according to the present embodiment has the shade 18 attached to the reflector 14, and the shade 18 also has the function of an aiming bracket. In other words, the shade is formed integrally with the aiming bracket. Therefore, the number of parts of the lighting fixture is reduced and the total cost of the lighting fixture can also be correspondingly reduced. Additionally, the shade 18, which is of a type integral with the aiming bracket, is composed of a press-formed steel plate member. Therefore, the costs of the shade 18 can further be reduced.

Thus, according to the present embodiment, it is possible to reduce the number of parts of the PES-type headlamp and reduce the total cost of the lighting fixture.

The shade 18 is made of steel plate, and the peripheral flange 18f is formed around the outer periphery of the shade 18. Moreover, the sections of the shade 18 around the fulcrum hole 18g and the mounting holes 18h, 18j are formed as stepped surfaces 18k, 18m and 18n. The shade 18 is therefore imparted a rigidity great enough to function as the aiming bracket.

Additionally, in the present embodiment, the two bosses 14j for mounting of the shade and the three forward projecting supporting pins 14k for positioning the shade are formed in the front end opening 14g of the reflector 14. The shade 18 is attached to the reflector 14 so that the shade 18 abuts the leading edge faces of the respective bosses 14j for mounting of the shade, and the leading edge faces of the large-diameter portions 14k1 of the respective supporting pins 14k for positioning the shade. Thus, a predetermined gap is formed between the front end opening 14g of the reflector 14 and the shade 18. The heat generated in the internal space of the reflector 14 is dissipated into the external space, whereby the risk of heat deformation to the reflector 14 is reduced.

Still further, in the present embodiment, the internal space of the reflector 14 communicates with the external space on the side of the bulb insertion hole 14b as well. This, combined the aforementioned structure for attachment of the shade, enables further enhancement of the effect of heat radiation.

Furthermore, in the present embodiment, the two bosses 14j for mounting of the shade are provided on the left and right sides of the front end opening 14g of the reflector 14. The respective bosses 14j are disposed radially outward beyond the condensing lens 16 and the lens holder, which makes it possible to secure the screws 24 through operation of a driver inserted from a position in front of the lighting fixture. Thereby, making it possible to enhance operability, for example, in exchanging component parts of the lighting fixture.

In the present embodiment, the small-diameter portions 14k2 of the three supporting pins 14k for positioning of the shade are inserted into the positioning holes 18c formed in the shade 18. Thus, when the shade 18 is attached to the reflector 14 the shade 18 is held in position, and the operability of mounting the lighting fixture is enhanced. Also, after the lighting fixture has been mounted, looseness between the shade 18 and the reflector 14 is prevented.

The present embodiment has been described with reference for the case where the light source bulb 12 is a halogen bulb of an H7type. However, even in the case where a halogen bulb of another type such as an H4 type is employed or where a discharge bulb or the like is employed, the operation and effects of the invention are substantially the same as in the present embodiment, and the same benefits can be obtained by adopting substantially the same structure as in the present embodiment.

It should further be apparent to those skilled in the art that various changes in form and detail of the invention as shown and described above may be made. It is intended that such changes be included within the spirit and scope of the claims appended hereto.

What is claimed is:

1. A vehicular headlamp assembly comprising:

a light source bulb;

a reflector, said reflector having an ellipsoid shape terminating at an open forward end and a smaller open rear end, and reflecting light from the light source bulb forward in a convergent manner;

a condensing lens provided at such a position that, of the light reflected from the ref lector, at least a meridian light flux is incident on said condensing lens as divergent light;

a shade provided in proximity to a position of convergence of said meridian light flux, blocking at least part of the reflected light; and an aiming bracket to which an aiming member for tilting the reflector is attached, wherein said shade and said aiming bracket are formed of a single, common metal plate member and are attached to said reflector.

2. The vehicular headlamp according to claim 1, wherein:

a plurality of forward projecting portions are formed in said open forward end of the reflector; and said shade is attached to said reflector so that said shade abuts said respective forward projecting portions.

3. The vehicular headlamp according to claim 1, wherein:

said shade is secured to said reflector at at least two forward projecting portions; and said respective forward projecting portions that secure said shade to said reflector are formed radially outward of said condensing lens.

4. The vehicular headlamp according to claim 2, wherein:

said shade is secured to said reflector at at least two of said forward projecting portions; and said respective forward projecting portions that secure said shade to said reflector are formed radially outward of said condensing lens.

5. The vehicular headlamp assembly according to claim 1, wherein said shade has a forward projecting peripheral flange formed along its periphery for strengthening said shade, and said shade has a plurality of stepped areas which project forward of a main surface of said shade and extend substantially parallel thereto for further strengthening said shade.

6. The vehicular headlamp assembly according to claim 2, wherein said shade has a forward projecting peripheral flange formed along its periphery for strengthening said shade, and said shade has a plurality of stepped areas which project forward of a main surface of said shade and extend substantially parallel thereto for further strengthening said shade.

7. The vehicular headlamp assembly according to claim 3, wherein said shade has a forward projecting peripheral flange formed along its periphery for strengthening said shade, and said shade has a plurality of stepped areas which project forward of a main surface of said shade and extend substantially parallel thereto for further strengthening said shade.

8. The vehicular headlamp assembly according to claim 4, wherein said shade has a forward projecting peripheral flange formed along its periphery for strengthening said shade, and said shade has a plurality of stepped areas which project forward of a main surface of said shade and extend substantially parallel thereto for further strengthening said shade.

9. A vehicular headlamp assembly comprising:

a light source bulb;

a reflector having an ellipsoid shape which terminates at an open forward end and a smaller open rear end, for reflecting light from the light source bulb forward in a convergent manner;

a condensing lens positioned so that, of the light reflected from the reflector, at least a meridian light flux is incident on said condensing lens as divergent light;

a metal plate member attached to said reflector, provided in proximity to a position of convergence of said meridian light flux, for blocking at least part of the reflected light and for tilting the reflector.

* * * * *